US006195571B1

(12) United States Patent
Osuge

(10) Patent No.: US 6,195,571 B1
(45) Date of Patent: *Feb. 27, 2001

(54) ELECTRONIC APPARATUS CAPABLE OF AUTOMATICALLY SWITCHING NOTIFICATION DEVICES

(75) Inventor: Michihiro Osuge, Tokyo (JP)

(73) Assignee: NEC Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/904,310

(22) Filed: Jul. 31, 1997

(30) Foreign Application Priority Data

Aug. 2, 1996 (JP) ........................ 8-204584

(51) Int. Cl.[7] ........................ H04Q 7/20

(52) U.S. Cl. ........................ 455/567; 455/550; 340/825.48

(58) Field of Search ........................ 455/567, 575, 455/90, 550, 351, 346; 340/825.48, 825.44, 825.46

(56) References Cited

U.S. PATENT DOCUMENTS

| | | | | |
|---|---|---|---|---|
| 4,419,668 | * | 12/1983 | Ganucheau, Jr. | 340/825.44 |
| 4,918,438 | * | 4/1990 | Yamasaki | 340/825.46 |
| 4,922,221 | * | 5/1990 | Sato et al. | 340/311.1 |
| 4,935,735 | | 6/1990 | DeLuca et al. . | |
| 5,189,389 | * | 2/1993 | DeLuca et al. | 340/825.55 |
| 5,258,751 | * | 11/1993 | DeLuca et al. | 340/825.44 |
| 5,442,345 | * | 8/1995 | Kwon | 340/825.46 |
| 5,463,368 | | 10/1995 | Tsunoda et al. . | |
| 5,493,280 | * | 2/1996 | Shibayama | 340/825.44 |
| 5,508,688 | * | 4/1996 | Mochizuki | 340/825.44 |
| 5,642,413 | * | 6/1997 | Little | 379/373 |
| 5,696,497 | * | 12/1997 | Mottier et al. | 340/825.44 |
| 5,828,314 | * | 10/1998 | Park | 340/825.44 |
| 5,986,567 | * | 11/1999 | Shima | 340/825.44 |

FOREIGN PATENT DOCUMENTS

| | | | |
|---|---|---|---|
| 0 247 601 | | 12/1986 | (EP) . |
| 0 631 262 | | 12/1993 | (EP) . |
| 631262 | * | 12/1994 | (EP) . |
| 2 271 694 | | 8/1993 | (GB) . |
| 62-281528 | | 12/1987 | (JP) . |
| 3-274832 | | 5/1991 | (JP) . |
| 3-274832 | | 12/1991 | (JP) . |
| 4-268854 | | 9/1992 | (JP) . |
| 5-136727 | | 1/1993 | (JP) . |
| 5-235830 | | 9/1993 | (JP) . |
| 6-77879 | | 3/1994 | (JP) . |
| 6-132875 | | 5/1994 | (JP) . |
| 9-322212 | | 12/1997 | (JP) . |
| WO 90/10359 | | 9/1990 | (WO) . |

* cited by examiner

*Primary Examiner*—Edward F. Urban
*Assistant Examiner*—Tilahun Gesesse
(74) *Attorney, Agent, or Firm*—McGuireWoods, LLP

(57) ABSTRACT

An electronic apparatus of the present invention and capable of automatically replacing notification means includes a vibrator (7). On the receipt of a radio signal, the vibrator 7 notifies the user of the apparatus to an incoming call first. A vibration detector (12) detects the vibration of the body of the apparatus, transforms it to an electric signal, and sends the electric signal to a vibration decision circuit (10) via an low pass filter (LPF) 11. In response, the decision circuit (10) determines whether or not the user is performing any motion. A timer (8) counts a preselected period of time based on a basic clock output from a clock generator (9). When the user does not press an answer button (5) even after the notification and when the decision circuit (10) does not detect vibration ascribable to the user's notion within the period of time counted by the timer (8), an call incoming and notifying control circuit (4) replaces the notification using the vibrator (7) with a notification using a buzzer 6. If the user is determined to be moving, the call incoming and notify controller 4 resets a timer 8 to its initial value and causes it to start counting again.

18 Claims, 13 Drawing Sheets

VIBRATION DETECTOR 12

ELECTRONIC APPARATUS CAPABLE OF AUTOMATICALLY SWITCHING NOTIFICATION DEVICES

BACKGROUND OF THE INVENTION

1. Field of the Invention

The present invention relates to an electronic apparatus and, more particularly, to a portable miniature electronic apparatus capable of automatically switching two or more different kinds of notification devices, such as vibrator, buzzer, light emitting diode (LED), liquid crystal display (LCD).

2. Description of the Related Art

Electronic apparatuses of the type described include a calling apparatus taught in, e.g., Japanese laid-open patent application heisei 3-274832. The calling apparatus includes a vibration detecting device. So long as the vibration detecting device detects vibration derived from the action or the movement of the human body, the apparatus determines that the user is moving with the apparatus put on the user's body, and notifies the user via a vibrator at the time of call incoming. When the vibration detecting device does not detect any vibration for a preselected period of time since the detection of the above vibration, the apparatus determines that the user is away from the apparatus. The apparatus produces a notification using sound at the time of call incoming after the preselected period of time. In this manner, the apparatus automatically selects either a notification using vibration or a notification using sound.

However, the above calling apparatus has some problems left unsolved, as follows. When the apparatus receives a call within a preselected period of time after the detection of vibration derived from the movement of the human body, it produces the notification using the vibrator. This prevents a notification from being produced by an adequate method matching the user's situation. For example, even when the user carrying the apparatus enters a room, puts the apparatus on a desk, and then leaves the room, the apparatus simply drives the vibrator on the receipt of a call, despite that the user cannot notice the notification. Further, when vibration is not detected for a preselected period of time after the detection of vibration caused by the movement of the human body, the apparatus produces the notification using sound on the receipt of a call. Therefore, when the user does not move over a long period of time while putting the apparatus on the user's body, the apparatus produces the notification using sound despite that the notification using the vibration is more preferable. In this case, the sound is apt to annoy persons around the user.

Japanese laid-open patent application heisei 5-136727 discloses a mobile communication terminal so constructed as to recognize the condition of movement of the terminal by detecting the amount of vibration of the terminal occurred within a preselected period of time. If the amount of vibration of the terminal is lower than a preselected level, the terminal determines that the user is not moving, and selects a notification using a vibrator. If the amount of vibration is higher than the above level, the terminal determines that the user is moving, and selects a notification using sound. In this manner, the terminal automatically selects either a notification using the vibrator or a notification using sound.

The mobile communication terminal determines, when the amount of vibration of its body is lower than the preselected level, that the user is not moving, and produces the notification using the vibrator, as stated above. This also prevents a notification from being produced by an adequate method matching the user's situation. For example, even when the user puts the terminal on a desk and leaves the desk, the terminal drives the vibrator despite that the user cannot notice the vibration. The terminal therefore cannot adequately select the notification devices matching the user's situation.

Another problem with the conventional calling device and mobile communication terminal is that they continuously produce the notification using the vibrator even in a situation which prevents the user from noticing vibration, e.g., when they are put in a car or a bag.

SUMMARY OF THE INVENTION

It is therefore an object of the present invention to provide an electronic apparatus capable of automatically switching a plurality of notification devices in accordance with the user's situation during the notification.

It is another object of the present invention to provide an electronic apparatus capable of surely noticing users call incoming.

It is a further object of the present invention to provide an electronic apparatus with improved manipulability.

In order to achieve the above objects, an electronic apparatus of the present invention includes a call incoming and notifying control circuit. The call incoming and notifying controller detects the user's reaction to a notification using vibration, and automatically switches notification devices on the basis of the user's reaction within a preselected period of time. The user's reaction should preferably be determined on the basis of the amplitude of a signal waveform from which, among vibration components particular to the apparatus, the vibration component of a vibrator itself has been removed by an low pass filter (LPF). Preferably, when the user's reaction is not detected within the preselected period of time, a call incoming and notifying controller switches the notification devices. Also, the call incoming and notifying controller should preferably be capable of varying the notification devices switching time on the basis of the detected user's reaction.

In the above construction, the call incoming and notifying controller effects a notification using vibration for a relatively short preselected period of time, and then effects a notification using sound. At this instant, if the user is determined to be moving, the call incoming and notifying controller resets a timer to its initial value and causes it to start counting again. That is, if the user is moving during the notification, the call incoming and notifying controller continues the notification using vibration. Further, even when the user is not moving, the call incoming and notifying controller produces the notification using vibration if the user notices the notification and is moving to answer it. When the user's motion cannot be detected, e.g., when the apparatus is put on a desk, the call incoming and notifying controller replaces the notification using vibration with the notification using sound on the elapse of a preselected period of time.

As stated above, the present invention is capable of detecting the user's reaction to the notification using vibration, and therefore notifying the user by a method fitting the user's situation with the lapse of time.

BRIEF DESCRIPTION OF THE DRAWINGS

These and other objects, features and advantages of the present invention will become more fully apparent from the following detailed description taken in conjunction with the accompanying drawings in which.

DETAILED DESCRIPTION OF THE PREFERRED EMBODIMENTS

Figure 1:
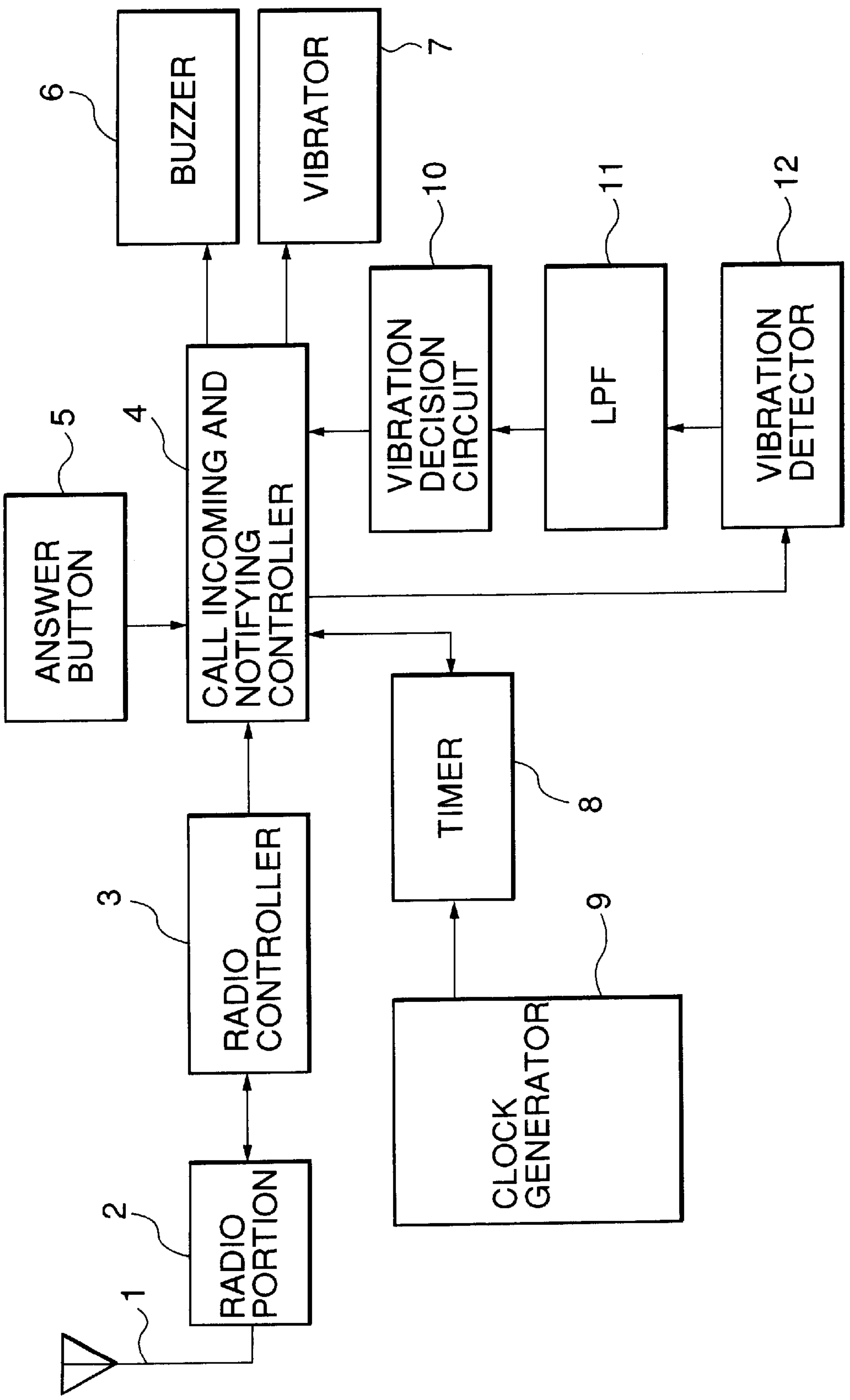
FIG. 1 is a block diagram schematically illustrating a radio communication apparatus embodying the present invention.

Referring to FIG. 1 of the drawings, an electronic apparatus embodying the present invention is illustrated and implemented as a radio selective call receiver, e.g., pager or portable telephone, or similar radio communication apparatus. In FIG. 1, the radio pager includes an antenna 1 for receiving a paging signal sent from a base station, not shown. The paging signal is applied to a radio portion 2. A radio controller 3 performs various kinds of control including battery saving control for the radio portion 2. A call incoming and notifying controller 4 selects either one of a buzzer 6 and a vibrator 7, or other notification devices, on the basis of the output of a timer 8 and that of a vibration decision circuit 10. As a result, the buzzer 6 or the vibrator 7 is driven to notify the user of the incoming call. The notifying devices may include LED, LCD. The notification ends when the user operates an answer button 5. That is, whether or not the answer button 5 is operated indicates the user's reaction to the incoming call. Preferably, the words "user's reaction" refer to an occurrence whether or not the user presses the answer button 5 or the user touches the body of the pager. A clock generator 9 generates a basic clock which the timer 8 counts.

A vibration detector 12 detects the vibration of the body of the radio pager and transforms it to an electric signal. The vibration of the body includes vibration caused by the vibrator 7 and vibration caused by the user's movement. An LPF 11 removes from the electric signal output from the vibration detector 12 at least a high frequency component corresponding to the vibration of the vibrator 7. Preferably, the LPF 11 removes the above high frequency component while outputting only a frequency component derived from extraneous vibration. The vibration decision circuit 10 determines, based on the output of the LPF 11, whether or not the user of the radio pager is moving. The call incoming and notifying controller 4 selects either the radio portion 2 or the vibrator 7 in response to the output of the vibration decision circuit 10, as will be described specifically later. Preferably, the call incoming and notifying controller 4 selects the vibrator 7 when the user is moving, as determined by the decision circuit 10, or selects the buzzer 6 when the user is not moving or acting. Further, when the call incoming and notifying controller 4 determines, based on the timer 8, that the user has not moved at all over a preselected period of time, it selects the buzzer 6.

Figure 2:
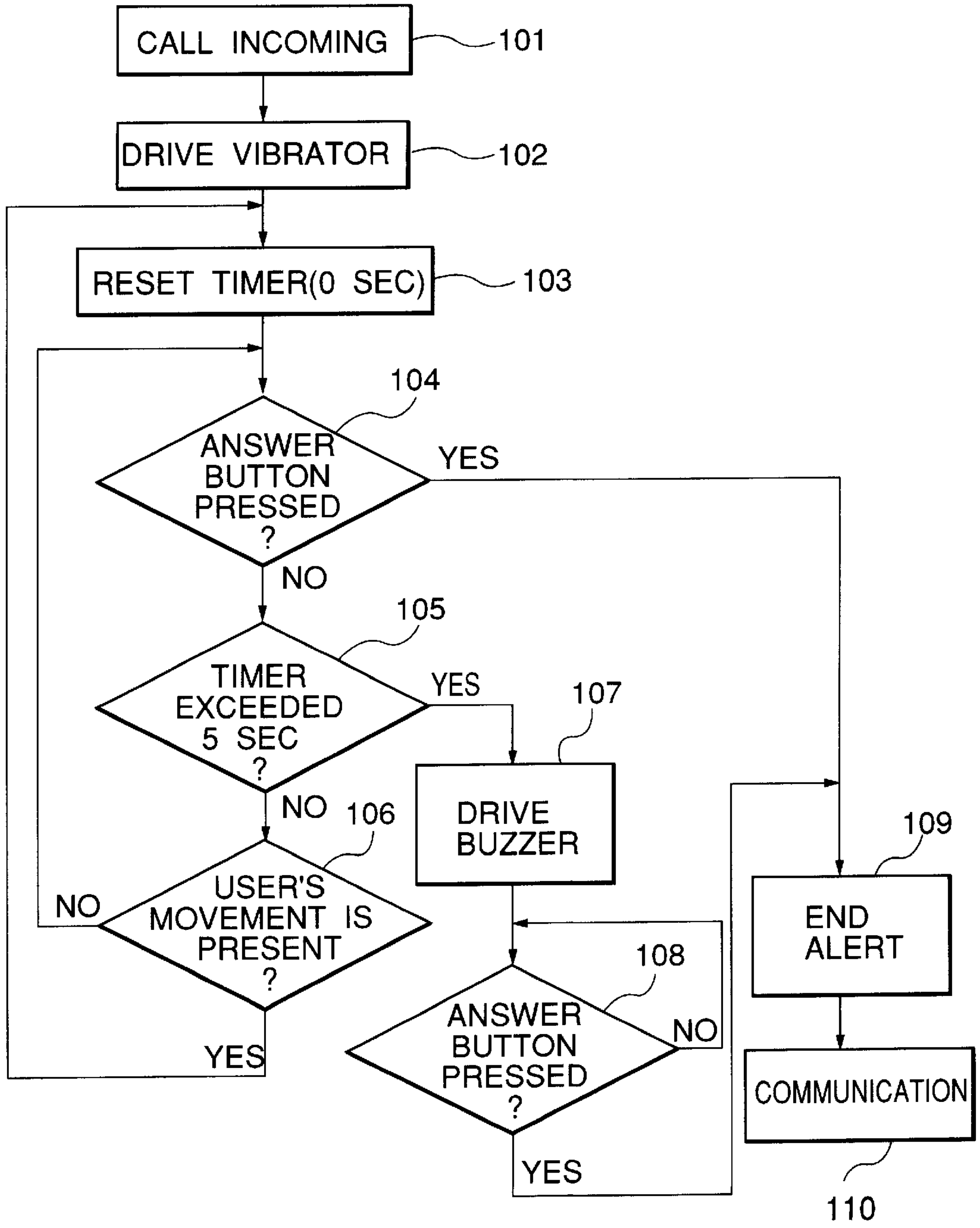
FIG. 2 is a flowchart demonstrating a preferred operation of the embodiment.

Reference will be made to FIG. 2 for describing a specific operation of the illustrative embodiment. In FIG. 2, the radio portion 2 delivers the paging signal coming in through the antenna 1 to the call incoming and notifying controller 4 via the radio controller 3 so as to effect call incoming processing. (step 101). In response to the signal, the call incoming and notifying controller 4 drives the vibrator 7 in order to notify the user to the call by vibration (step 102). Subsequently, the call incoming and notifying controller 4 resets the timer 8 to its initial value "0 (second)" (step 103). The timer 8 counts up, with the elapse of time, the clock signal input thereto from the clock generator 9.

Subsequently, the call incoming and notifying controller 4 determines whether or not the answer button 5 is pressed (step 104). If the answer of the step 104 is negative (NO), the call incoming and notifying controller 4 determines whether or not a first preselected period of time has elapsed on the basis of the count of the timer 8 (step 105). The user is expected to notice the call and answer within the first period of time which may be 5 seconds by way of example. By determining whether or not the user has pressed the answer button 5 within the above preselected period of time after the notification using vibration, the call incoming and notifying controller 4 can see the user's reaction.

If the timer 8 has not exceeded the preselected period of time (NO, step 105), the call incoming and notifying controller 4 determines, based on the output of the vibration decision circuit 10, whether or not vibration derived from the user's movement is present, i.e., whether or not extraneous vibration exists(step 106). If the answer of the step 106 is NO, the call incoming and notifying controller 4 repeats the above steps 104–106. If the answer of the step 106 is positive (YES), the call incoming and notifying controller 4 resets the timer 8 to "0" and then repeats the steps 103–106.

If the answer of the step 104 is YES, meaning that the user has pressed the answer button 5, the call incoming and notifying controller 4 ends the notification using vibration (step 109) and enters into communication (step 110).

If the answer of the step 105 is YES, the call incoming and notifying controller 4 drives the buzzer 6 instead of the vibrator 7 (step 107). Specifically, when the first period of time expires without vibration derived from the user's movement being detected, the call incoming and notifying controller 4 replaces the notification using vibration with the notification using sound. Thereafter, the call incoming and notifying controller 4 determines whether or not the answer button 5 is pressed (step 108). If the answer of the step 108 is YES, the call incoming and notifying controller 4 ends the notification using sound (step 109) and enters into communication (step 110). If the answer of the step 108 is NO, the call incoming and notifying controller 4 continuously notifies the user to the call by use of sound until the user notices it and presses the answer button 5.

Figure 3:
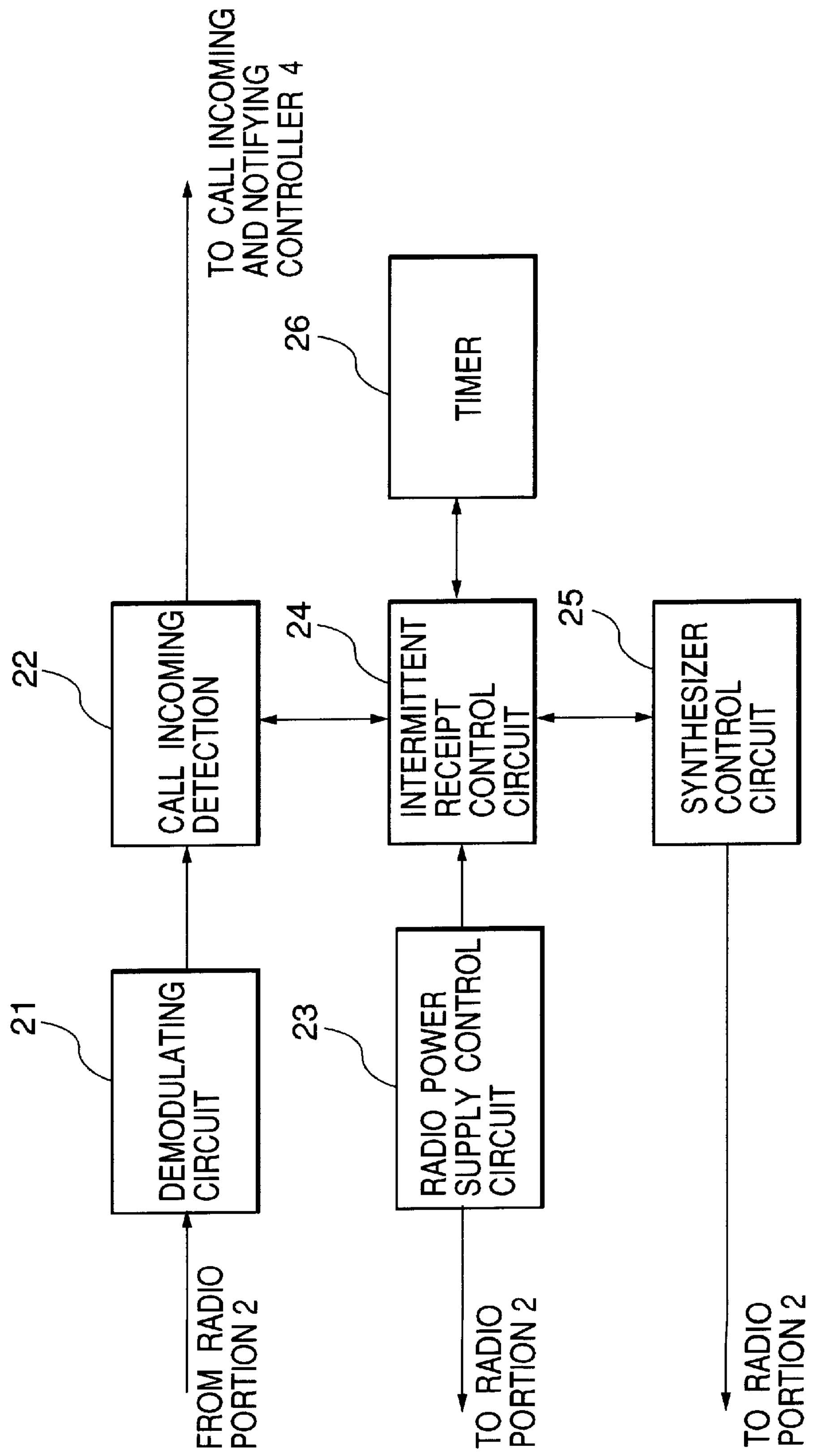
FIG. 3 is a block diagram schematically illustrating a preferred configuration of a radio controller shown in FIG. 1.

FIG. 3 illustrates a preferred configuration of the radio controller 3. In FIG. 3, the radio controller 3 includes an intermittent receipt timer 26 for counting a period in which whether or not call incoming has occurred is determined. On counting a period of time corresponding to the above period, the timer 26 delivers a receipt control signal to an intermittent receipt control circuit 24. In response, the intermittent receipt control circuit 24 resets the timer 26 and turns on a power supply for a call incoming detection 22. Also, the control circuit 24 feeds to a radio section power supply control circuit 23 and a synthesizer control circuit 25 a receipt start signal indicating that the receipt of a paging channel begins. In response, the radio power supply control circuit 23 turns on a power supply for the radio portion 2, FIG. 1. The synthesizer control circuit 25 tunes the receipt frequency of the radio portion 2 to the frequency of the paging channel. A demodulating circuit 21 demodulates the radio signal output from the radio portion 2 and feeds the resulting received data to the call incoming detecting circuit 22. The call incoming detecting circuit 22 determines whether or not the received data includes call incoming information. For example, the detecting circuit 22 determines whether or not an address number included in the received data is identical with an address number assigned to the pager and stored in a random access memory (RAM) not shown. If the two address numbers compare equal, the detecting circuit 22 delivers the previously mentioned call incoming control signal to the call incoming and notifying controller 4, FIG. 1. Subsequently, the detecting circuit 22 delivers to the intermittent receipt control circuit 24 a signal for interrupting the intermittent receipt. If the address numbers do not compare equal, the detecting circuit 22 causes the control circuit 24 to continue the intermittent receipt.

Figure 4:
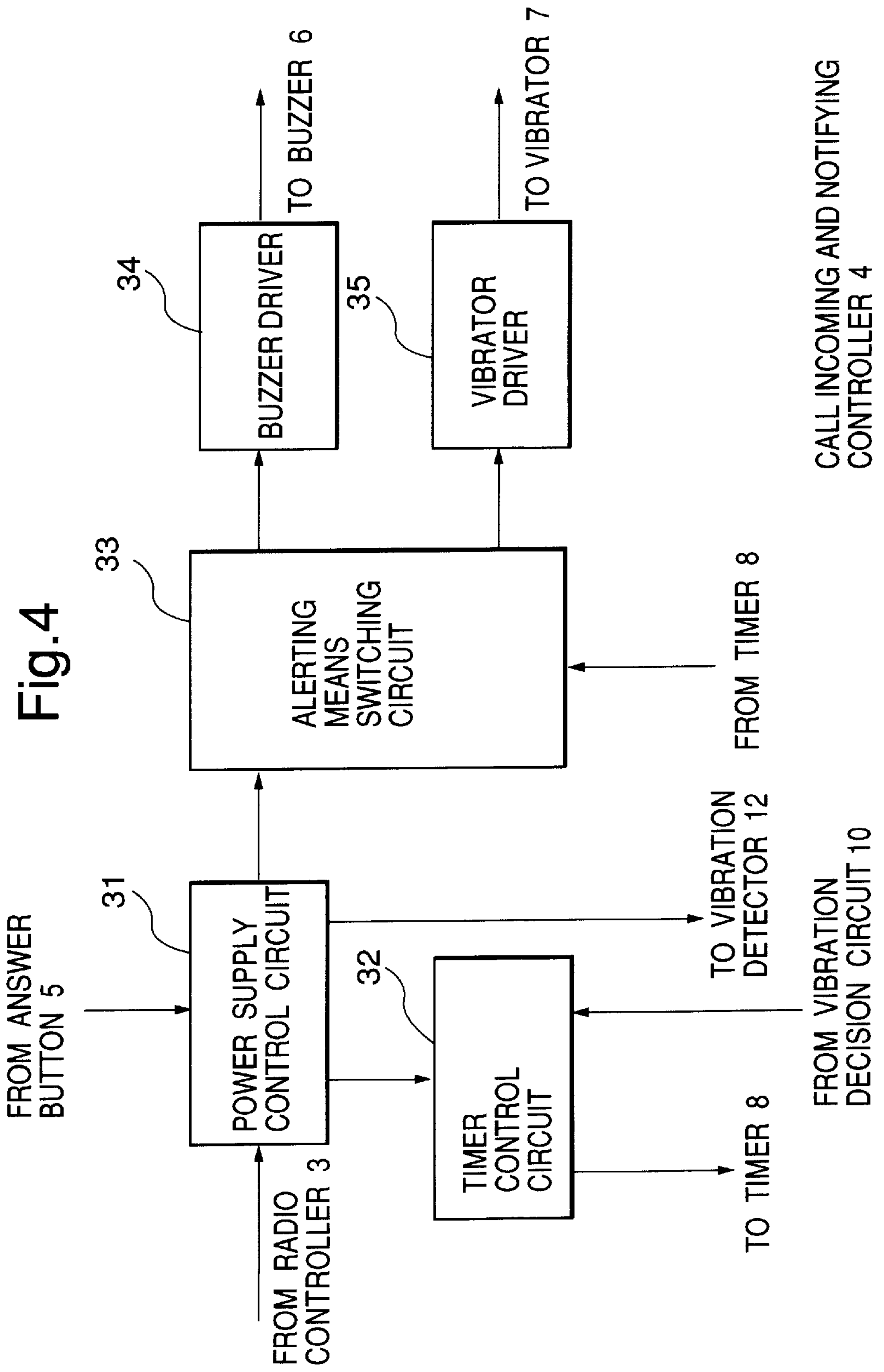
FIG. 4 is a block diagram schematically illustrating a preferred configuration of a call incoming and notifying controller also shown in FIG. 1.

FIG. 4 illustrates a preferred configuration of the call incoming and notifying controller 4. In FIG. 4, the call incoming and notifying controller 4 includes a power supply control circuit 31. On receiving the call incoming control signal from the call incoming detecting circuit 22, the power supply control circuit 31 turns on power supplies for a timer control circuit 32, a notification devices switching circuit 33, and the vibration detector 12, FIG. 1. In response, the timer control circuit 32 resets the timer 8, FIG. 1. The timer control circuit 32 resets the timer 8 also when it is informed of the presence of vibration by the vibration decision circuit 10, FIG. 1. The notification devices switching circuit 33 turns on a power supply for a vibrator driver 35. Subsequently, when the switching circuit 33 is informed of the elapse of the preselected period of time by the timer 8, the switching circuit 33 turns off the power supply for the vibrator driver 35, and instead turns on a power supply for a buzzer driver 34. When the user presses the answer button 5, FIG. 1, the power supply control circuit 31 turns off the power supplies for the timer control circuit 32, vibration detector 12, and notification devices switching circuit 33, and ends the call incoming processing.

Figure 5:
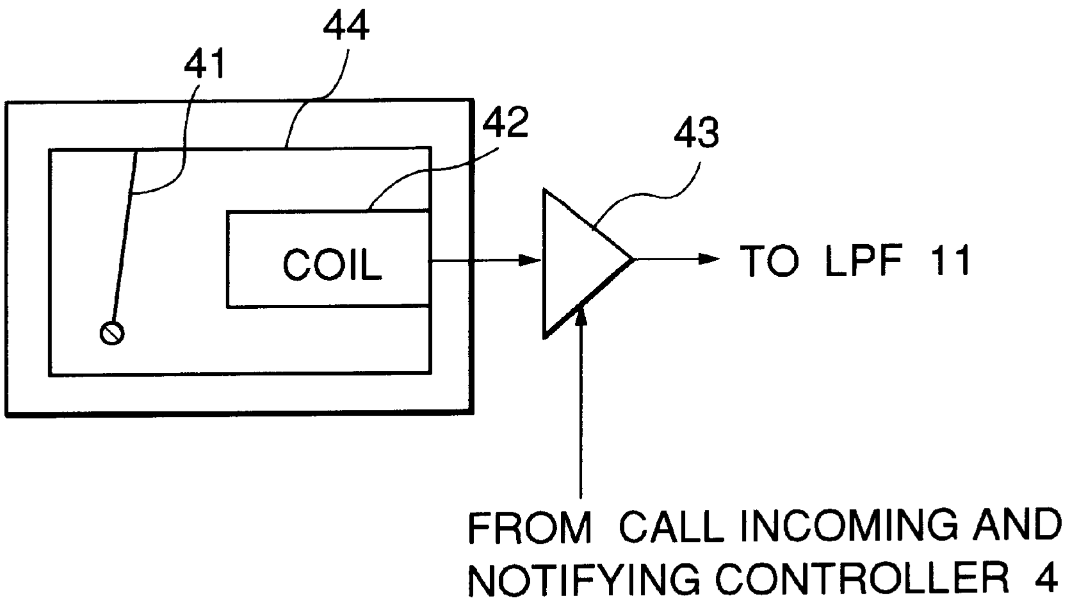
FIG. 5 illustrates a preferred configuration of a vibration detector further included in the embodiment.

FIG. 5 illustrates a preferred construction of the vibration detector 12. In FIG. 5, the vibration detector 12 includes a frame 44 and a pendular rod 41 swingably held by the frame 44 at one end thereof. When usual vibration occurs, the pendular rod 41 starts swinging with the result that an induced current flows through a coil 42 having an iron core. In response to a power ON signal fed from the call incoming and notifying controller 4, an AC amplifier 43 amplifies the induced current, transforms it to an electric signal, and sends the electric signal to the LPF 11, FIG. 1.

Figure 6A:
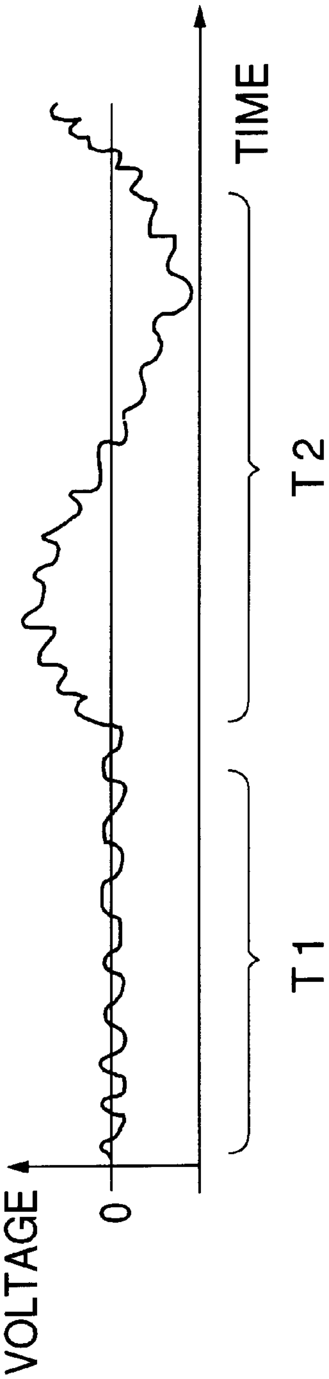
FIGS. 6A and 6B illustrate preferred waveforms of a signal output from the vibration detector.
Figure 6B:
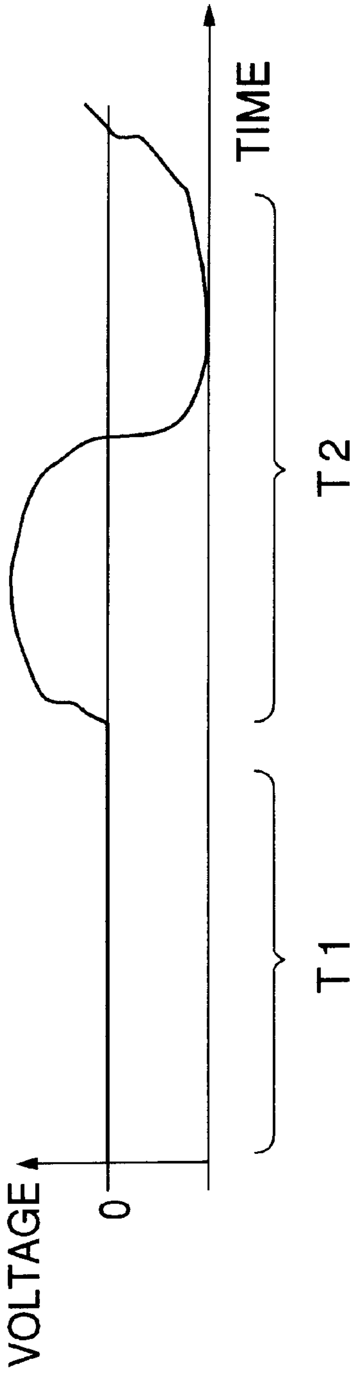

As shown in FIG. 6A, when the vibrator 7 is selected, the vibration of the vibrator 7 itself is added to the electric signal sent from the AC amplifier 43 to the LPF 11. Therefore, the electric signal is passed through the LPF 11 in order to remove the vibration of the vibrator 7. FIG. 6B illustrates the waveform of the resulting output of the LPF 11 which is an AC analog value. In FIGS. 6A and 6B, T1 and T2 are respectively representative of a condition wherein vibration is absent and a condition wherein it is present. It is to be noted that the LPF 11 is omissible if the presence of vibration can be determined without resorting to the removal of the high frequency component derived from the vibrator 7.

Figure 7:
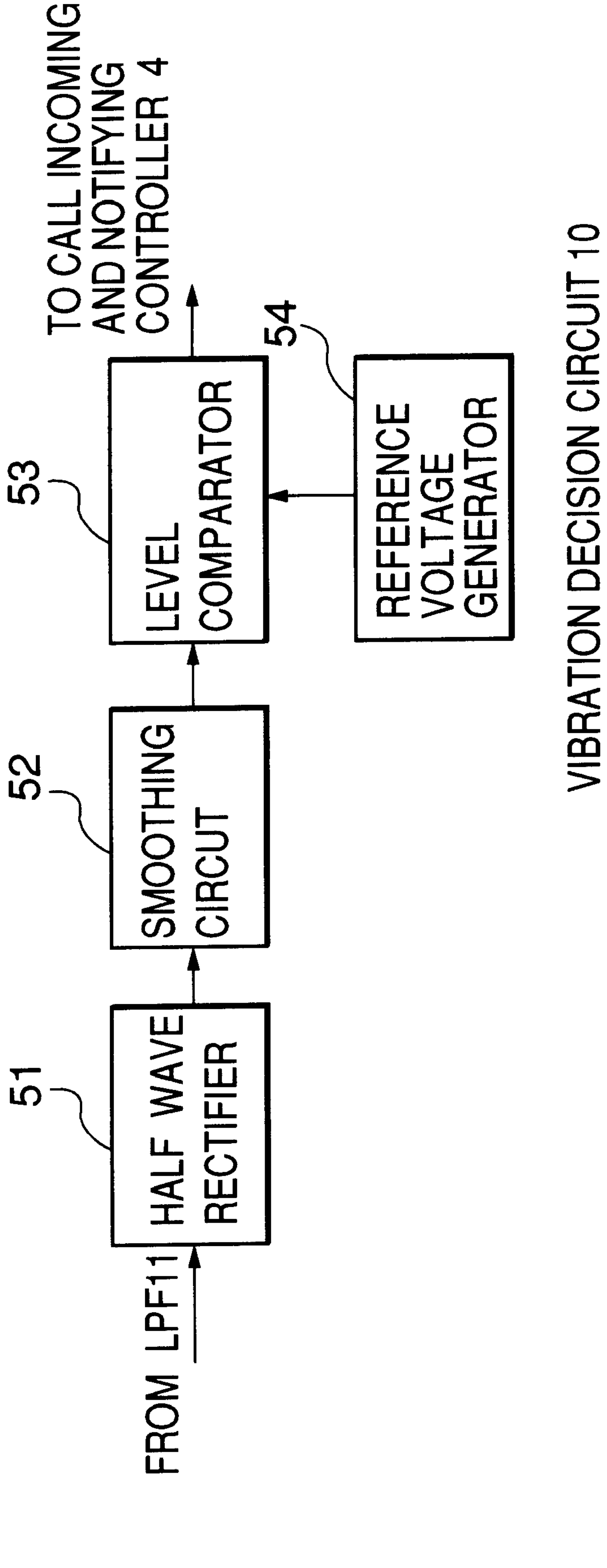
FIG. 7 is a block diagram schematically illustrating a preferred configuration of a vibration decision circuit included in the embodiment.
Figure 8A:
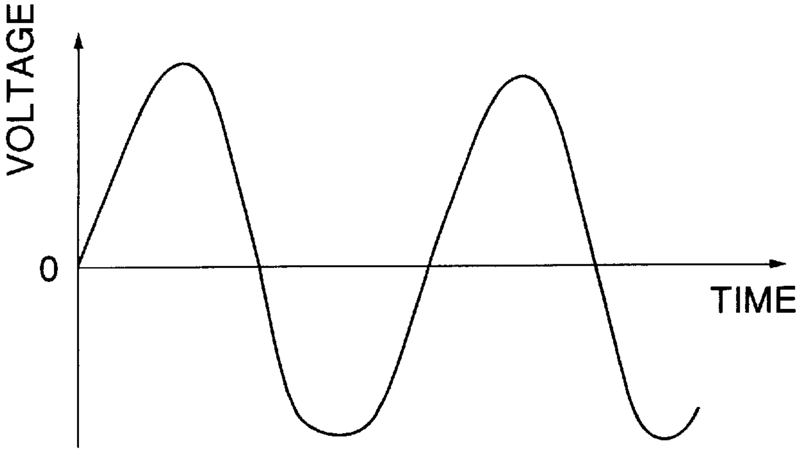
FIGS. 8A–8C illustrate preferred waveforms of a signal input to the vibration decision circuit.
Figure 8B:
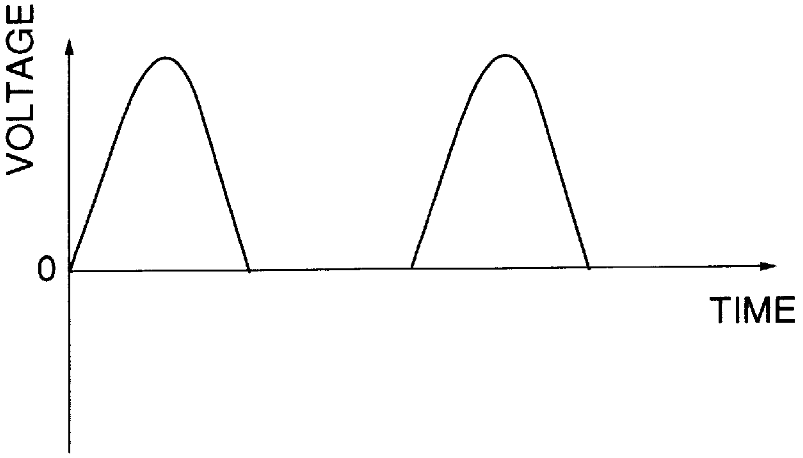
Figure 8C:
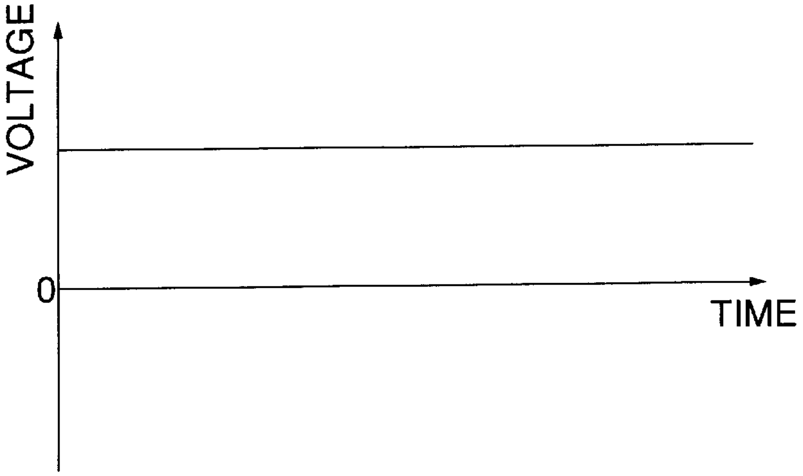

FIG. 7 illustrates a preferred configuration of the vibration decision circuit 10. In FIG. 7, the vibration decision circuit 10 includes a half wave rectifier 51. FIG. 8A illustrates an AC signal output from the vibration detector 12. The half wave rectifier 51 cuts the negative side of this AC signal so as to produce a half wave rectified signal shown in FIG. 8B. A smoothing circuit 52 smooths the half wave rectified signal and thereby transforms it to a DC signal shown in FIG. 8C. A level comparator 53 compares the DC signal with a reference voltage output from a reference voltage generator 54. If the DC signal is greater than the reference voltage, the level comparison 53 sends to the call incoming and notifying controller 4 a signal indicating that vibration is present.

Figure 9:
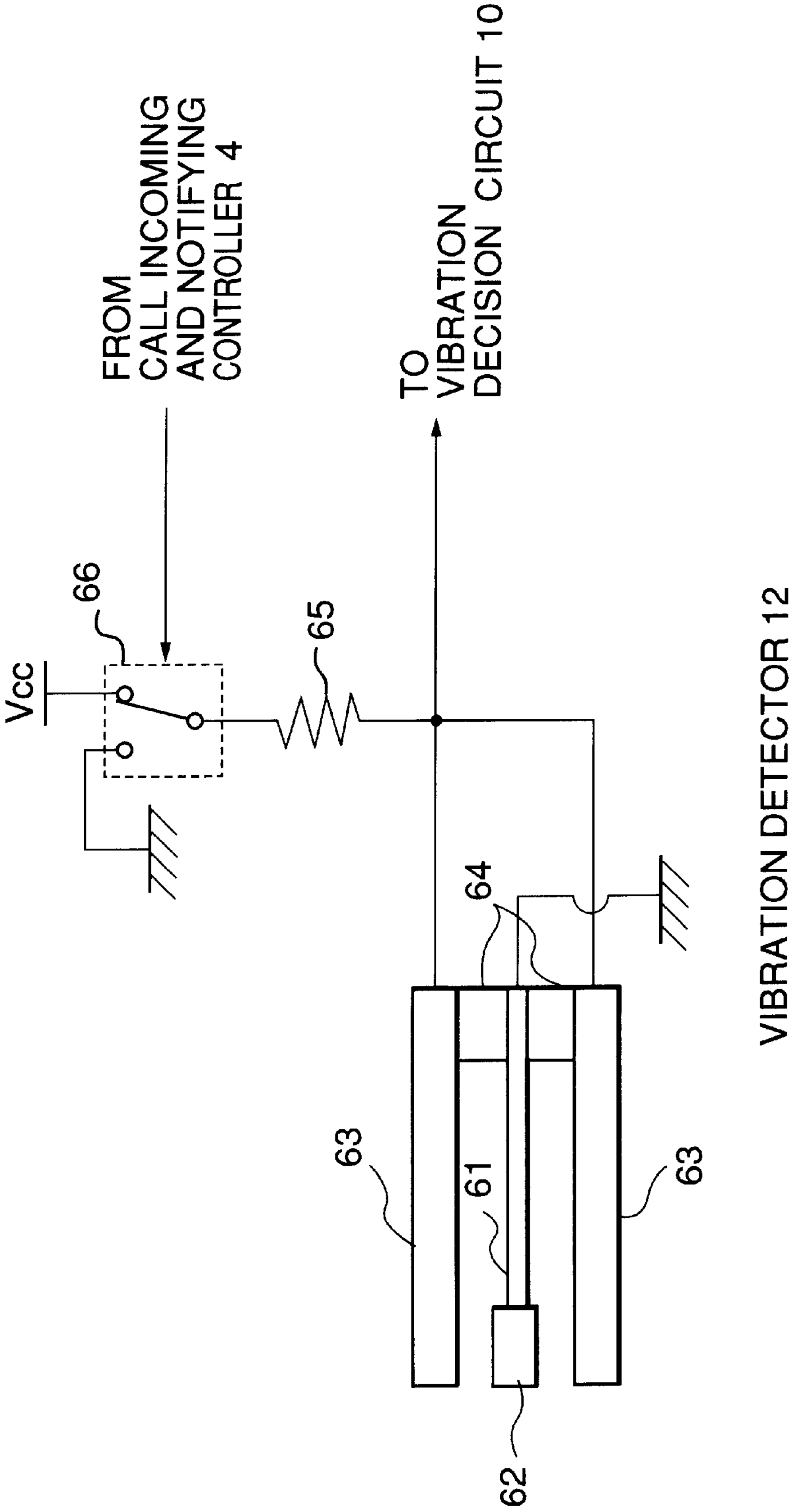
FIGS. 9 and 10 each illustrates another preferred configuration of the vibration detector in a particular condition.
Figure 10:
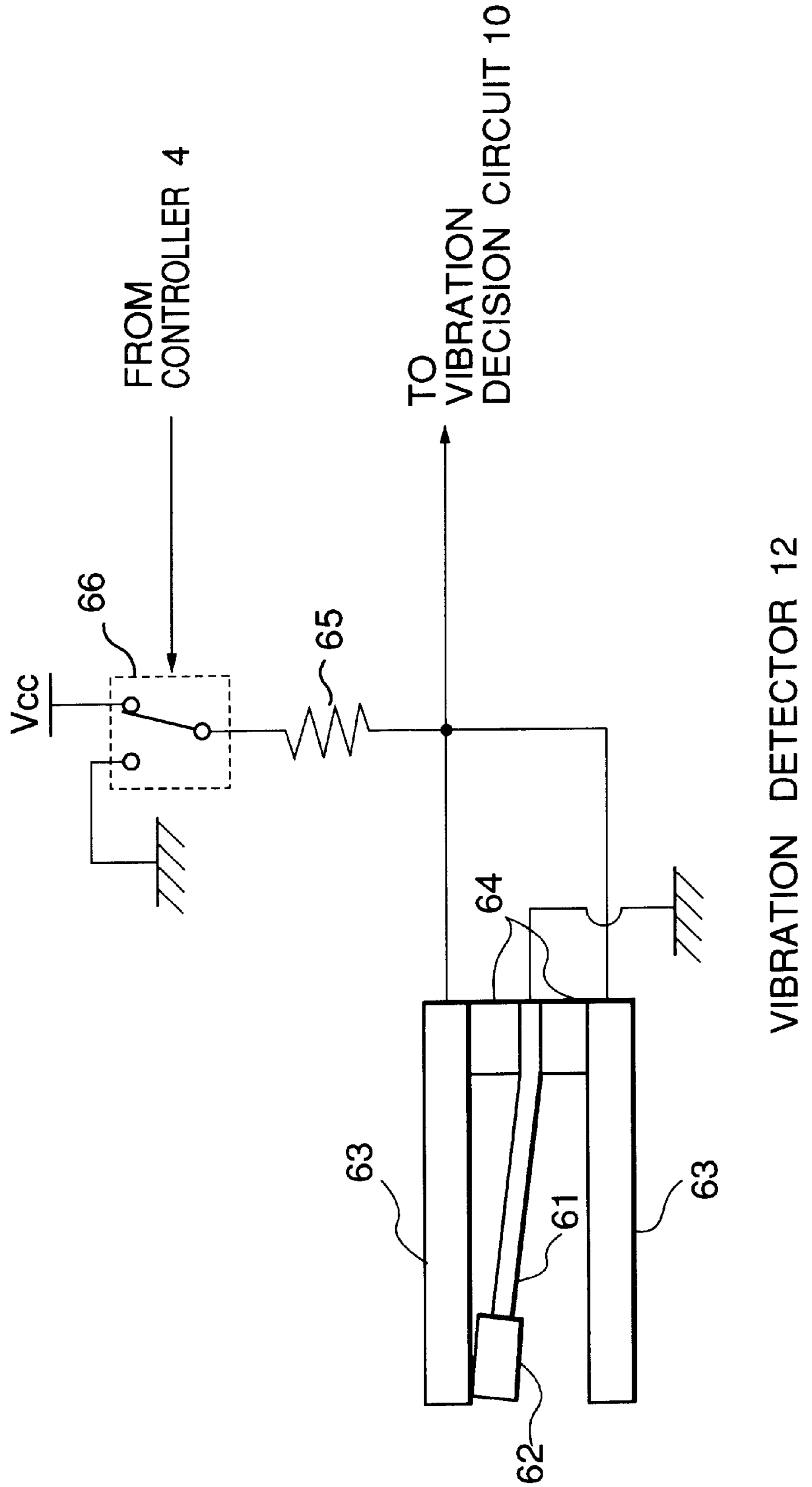
Figure 11:
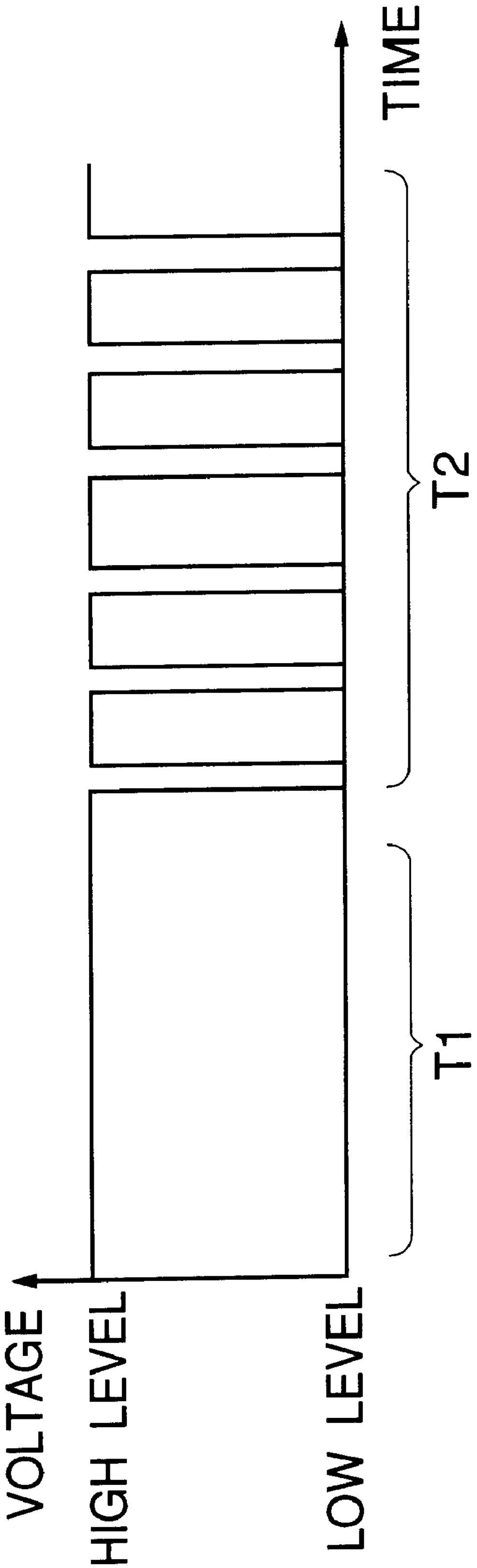
FIG. 11 illustrates preferred waveforms of a signal output from the vibration detector shown in FIGS. 9 and 10.

Another specific configurations of the vibration detector 12 and vibration decision circuit 10 will be described is with reference to FIGS. 9–11. As shown in FIG. 9, a switch 66 usually connected to ground is connected to a power supply voltage Vcc in response to a power ON signal received from the call incoming and notifying controller 4, FIG. 1. As a result, a low level or a high level output signal is sent to the vibration decision circuit 10.

A metallic weight 62 is affixed to the free end of a vibration plate 61. When usual vibration occurs, the weight 62 vibrates together with the vibration plate 61. As shown in FIG. 10, when G acting on the weight 62 exceeds a preselected 25 value, the weight 62 contacts metallic plates 63 and sets up electric conduction. However, electric conduction does not occur between the vibration plate 61 and the plates 63 due to insulators 64. On the conduction of the plates 63 and weight 62, a pull-up resistor 65 has opposite ends thereof connected to the power supply voltage Vcc and ground, causing a current to flow therethrough. As a result, the output signal is provided with the ground level, i.e., low level.

When vibration is absent, the weight 62 doesn't make contact with metallic plates 63, and therefore no currents flow through the pull-up resistor 65. As a result, the output signal is provided with a high level. The prerequisite is that the distance between the plates 63 be so adjusted as to prevent the weight 62 from contacting the plates 63 in response to vibration caused by the vibrator 7. In this case, the output signal of the vibration detector 12 is directly input to the vibration decision circuit 10 without the intermediary of the LPF 11. FIG. 11 illustrates a preferred waveform of the output voltage of the vibration detector 12 which is a digital value. In FIG. 11, T1 and T2 respectively illustrate a condition wherein vibration is absent and a condition wherein it is present. When vibration is present, the plates 63 and weight 62 contact each other and cause the output voltage to go low and go high repeatedly in the form of pulses.

The vibration decision circuit 10 is implemented as a counter. Because the output of the vibration detector 12 is a digital value, the counter counts the input pulses. When vibration occurs, the counter counts up the input pulses and sends, on counting, e.g., two consecutive negative-going edges, a signal representative of the presence of vibration to the call incoming and notifying controller 4. The counter should preferably start operating in response to a power ON signal fed from the call incoming and notifying controller 4 in order to prevent current consumption from increasing.

Figure 12:
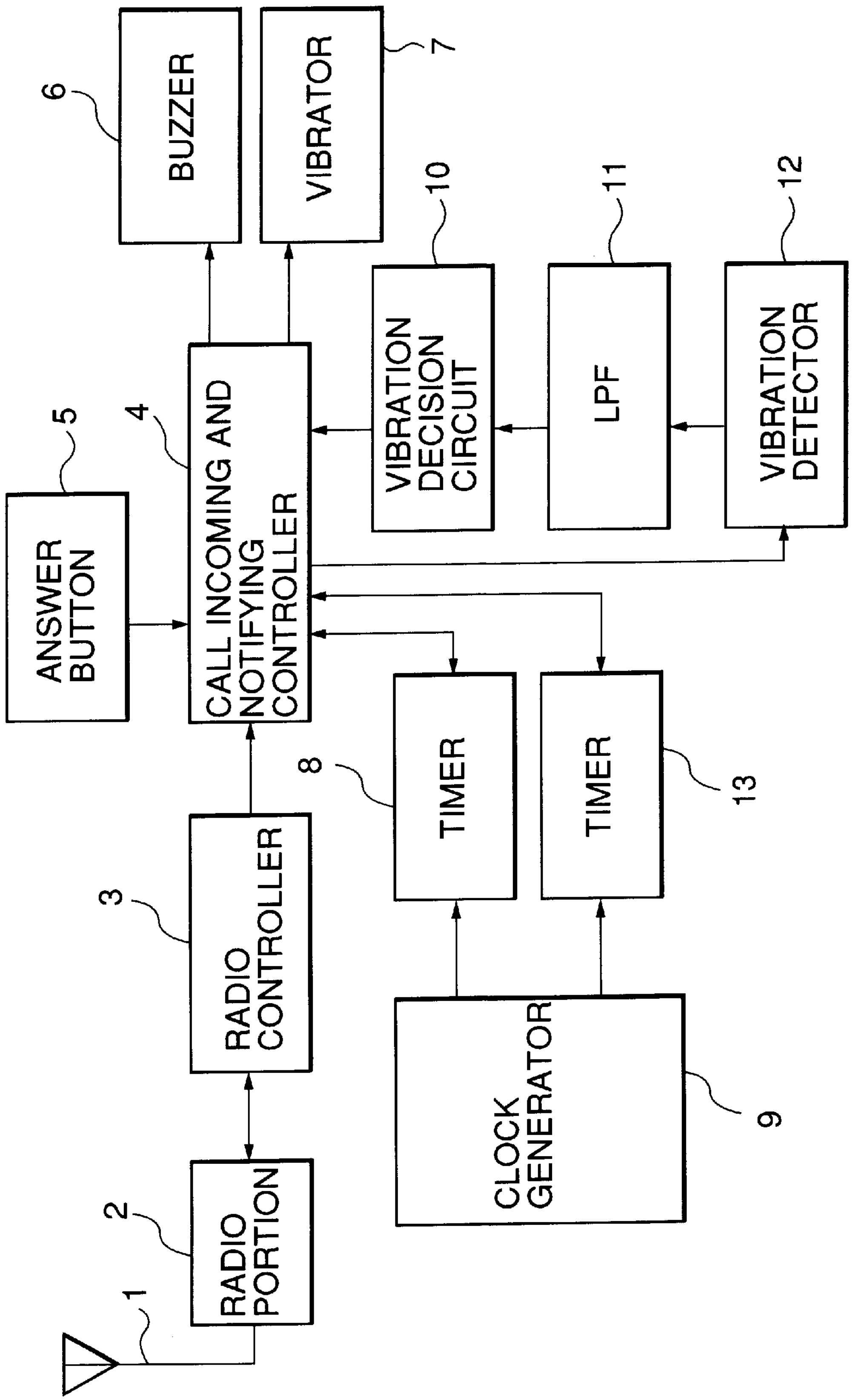
FIG. 12 is a block diagram schematically illustrating an alternative embodiment of the present invention.

Referring to FIG. 12, an alternative embodiment of the present invention will be described. In FIG. 12, the same structural elements as the elements shown in FIG. 1 are designated by identical reference numerals. In FIG. 12, this embodiment includes a second timer 13 in addition to the first timer 8. A second preselected period of time preferably longer than the first period of time, e.g., 30 seconds is set in the second timer 13.

Figure 13:
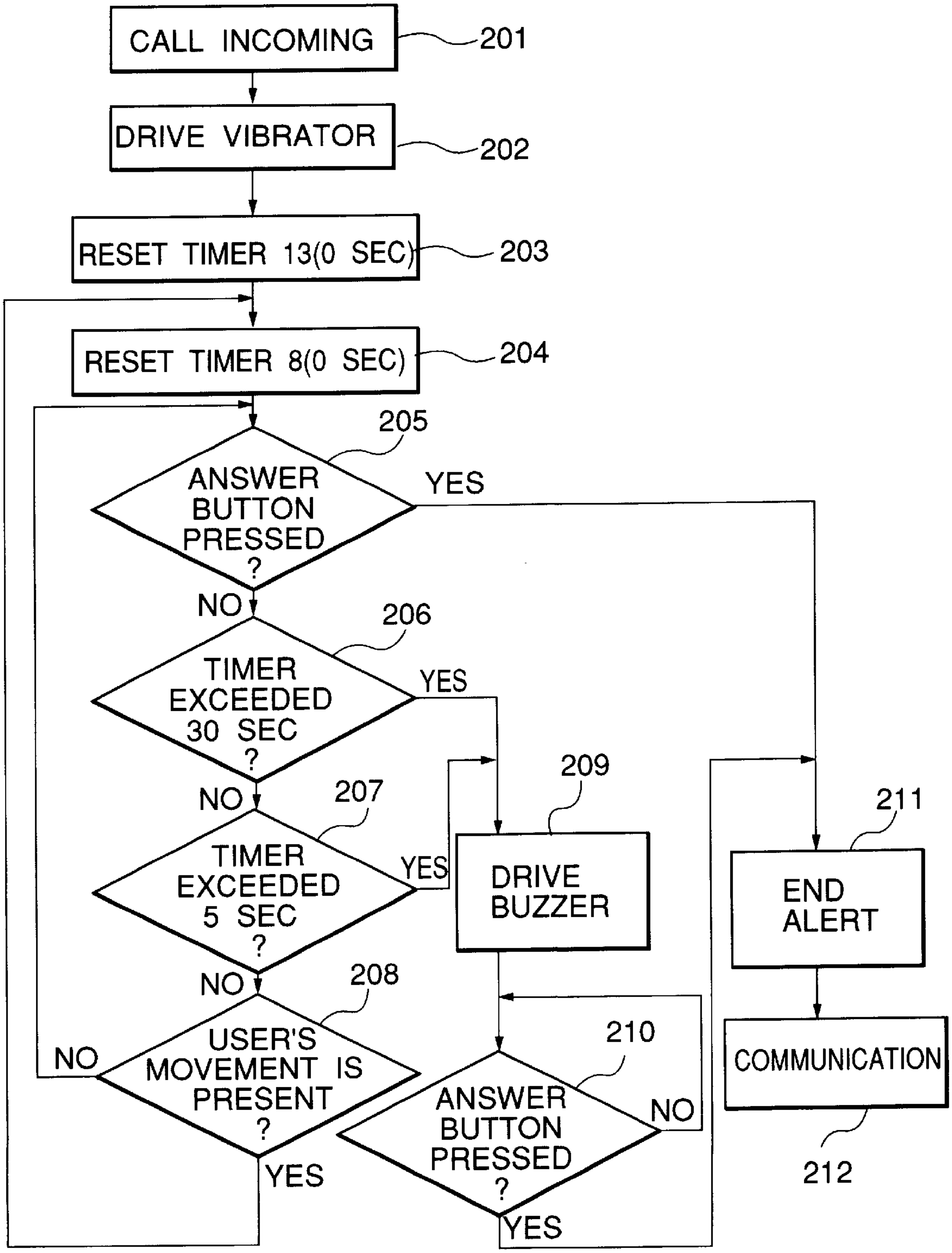
FIG. 13 is a flowchart demonstrating a preferred operation of the alternative embodiment.

FIG. 13 demonstrates a preferred operation of the alternative embodiment. In FIG. 13, on receiving a call incoming signal (step 201), the call incoming and notifying controller 4 drives the vibrator 7 for notifying the user to the receipt of a call (step 202). Subsequently, the call incoming and notifying controller 4 resets both the timers 13 and 8 to their initial value "0 (second)" (steps 203 and 204). The timers 8 and 13 count up the clock signal input from the clock generator 9 with the elapse of time.

Subsequently, the call incoming and notifying controller 4 determines whether or not the answer button 5 is pressed (step 205). If the answer of the step 205 is NO, the call incoming and notifying controller 4 determines whether or not the timer 13 has exceeded the second period of time, e.g., 30 seconds (step 206). If the answer of the step 206 is NO, the call incoming and notifying controller 4 determines whether or not the timer 8 has exceeded the previously stated first period of time, e.g., 5 seconds (step 207). In this manner, the call incoming and notifying controller 4 detects the user's reaction on the basis of whether or not the answer button 5 is pressed within a preselected period of time after the notification using vibration.

If neither the timer 13 nor the timer 8 has exceeded the respective period of time (NO, step 207), the call incoming and notifying controller 4 checks the output of the vibration decision circuit 10 to see if vibration ascribable to the user's movement is present or not (step 208). If the answer of the step 208 is NO, the call incoming and notifying controller 4 repeats the steps 205–207 while sequentially incrementing the timers 8 and 13. If the answer of the step 208 is YES, the call incoming and notifying controller 4 resets the timer 8 to "0" and then repeats the steps 204–208. At this instant, the timer 13 continuously counts the clock signal.

If the answer of the step 205 is YES, meaning that the user has pressed the answer button 5, the call incoming and notifying controller 4 executes steps 211 and 212.

If the answer of the step 206 is YES or if the answer of the step 207 is YES, the call incoming and notifying controller 4 executes steps 209–212. The steps 209–212 are identical with the steps 107–110 shown in FIG. 11 and will not be described in order to avoid redundancy.

Assume that the user walks with the radio pager put in the user's bag. Then, the above embodiment causes the vibration detector 12 to detect vibration ascribable to the user's motion, so that the pager continuously notifies the user to the call by use of vibration. However, if the user does not press the answer button 5 over a long period of time despite the notification, the notification using vibration is automatically replaced with the notification using sound, allowing the user to surely notice the call.

In summary, in accordance with the present invention, an electronic apparatus automatically replaces a notification using vibration with a notification using sound, depending on the user's reaction to the notification using vibration. The apparatus can therefore notify the user to the incoming call by use of notification devices more fitting the situation. This makes it needless for the user to set notification devices by hand and thereby enhances manipulability.

Further, on detecting vibration derived from the user's movement, the apparatus resets a timer and causes it to start counting time again. This allows the interval between the notification using vibration and the notification using sound to be adjusted, and thereby allows a notification to be produced in a manner matching any particular situation. For example, assume that a substantial period of time is necessary for the user to pick up the apparatus out of a pocket and then press the answer button after noticing an incoming call. Then, the apparatus does not replace the notification using vibration with the notification using sound during such a motion of the user. The apparatus therefore does not annoy persons around it. When the apparatus is put on a desk, the transition from the notification using vibration to the notification using sound occurs in a short period of time and allows the user to notice the incoming call earlier.

While the illustrative embodiments shown and described include one or two timers, the present invention is practicable with any desired number of timers. The notification devices using vibration and sound is only illustrative. For example, a plurality of timers and a plurality of notification devices may be combined.

In the preferred operation shown in FIG. 2, when vibration derived from the user's movement is present, the steps 103–106 are repeated. Alternatively, when the steps 103–106 are repeated a preselected number of times, the notification using sound may be effected in place of the notification using vibration (step 107). In such an alternative case, an implementation for counting the number of times of repeated processing, preferably a counter, is necessary. The number of times may be set in the apparatus beforehand or may be set by the user. To allow the user to set the number of times, a keypad or similar implementation is required.

In the preferred operation shown in FIG. 2 or 13, after the substitution of the notification using sound for the notification using vibration (step 108 or 209), the notification using sound continues until the user presses the answer button 5 (step 109 or 210). If desired, the notification sound may be automatically ended on the elapse of a preselected period of time which is counted by, e.g., an additional timer. This period of time may be counted by the timer 8 or 13 and may be set in the apparatus beforehand or set by the user.

While the embodiments each detects vibration only at the time of call incoming, vibration may be constantly detected, in which case the switch 66, FIG. 9, is omissible. It should be noted that the present invention is applicable not only to a radio pager but also to any kind of electronic apparatus capable of automatically switching its notification devices.

Obviously, numerous additional modifications and variations of the present invention are possible in light of the above teachings. It is therefore to be understood that within the scope of the appended claims, the invention may be practiced otherwise than as specifically described herein.

What is claimed is:

1. An electronic apparatus comprising:

first notification means using vibration for notifying users;

second notification means using sound for notifying users;

first counting means for counting a first preselected period of time;

reaction detecting means for detecting a user's reaction to a notification;

movement detecting means for detecting movement of a user; and switching means for automatically switching said first and second notification means in accordance with outputs of said reaction detecting means and said movement detecting means appearing within said first period of time, wherein said movement detecting means comprises:

a vibration detector for detecting vibration;

an LPF for removing vibration caused by said first notification means from an output of said vibration detector; and a vibration detection circuit for identifying the extraneous vibration out of an output of said LPF.

2. An apparatus as claimed in claim 1, wherein the user's reaction comprises a press of an answer button provided on said apparatus.

3. An apparatus as claimed in claim 1, wherein said first and second notification means are responsive to a call incoming.

4. An apparatus as claimed in claim 1, wherein said apparatus comprises a radio communication apparatus.

5. An apparatus as claimed in claim 1, wherein said apparatus comprises a radio pager.

6. An apparatus as claimed in claim 1, wherein said switching means automatically replaces said first notification means with said second notification means when said reaction detecting means does not detect a user's reaction within said first period of time counted by said counting means.

7. An apparatus as claimed in claim 1, wherein said switching means automatically replaces said first notification means with said second notification means when said movement detecting means does not detect an extraneous vibration other then vibration caused by said first notification means within said first period of time counted by said counting means.

8. An apparatus as claimed in claim 1, wherein said switching means automatically replaces said first notification means with said second notification means when said reaction detecting means does not detect a user's reaction and said movement detecting means does not detect extraneous vibration within said first period of time counted by said counting means.

9. An apparatus as claimed in claim 1, further comprising:

second counting means for counting a second preselected period of time longer than said first period of time.

10. An apparatus as claimed in claim 9, wherein said switching means automatically replaces said first notification means with said second notification means when said reaction detecting means does not detect a user's reaction within said second period of time counted by said second counting means.

11. An apparatus as claimed in claim 9, wherein said movement detecting means detects movement of a user by detecting an extraneous vibration other than vibration caused by said first notification means, and wherein said switching means automatically replaces said first notification means with said second notification means when said movement detecting means detects the extraneous vibration within said second period of time counted by said second counting means.

12. An apparatus as claimed in claim 9, wherein said movement detecting means detects movement of a user by detecting an extraneous vibration other than vibration caused by said first notification means, and wherein said switching means automatically replaces said first notification means with said second notification means when said reaction detecting means does not detect the user's reaction, but said movement detecting means detects the extraneous vibration, within said second period of time counted by said second counting means.

13. An apparatus as claimed in claim 9 further comprising an answering means for answering in response to either said first notification means or second notification means, and wherein said switching means for automatically switching also switches said first and second notification means in response activation or non activation of said answering means within said second period of time.

14. An apparatus as claimed in claim 1, further comprising:

control means for expanding a time to switch said notification means in case said movement detecting means detects movement of said user.

15. An electronic apparatus comprising:

a vibrator for notifying users;

a buzzer for notifying users;

a first timer for counting a first preselected period of time;

an answer button for detecting a user's reaction to a notification;

a movement detector which detects movement of a user; and switching means for automatically switching a notification using said vibrator and a notification using said buzzer on a basis of whether or not said answer button is pressed within said preselected period of time and whether or not said movement detector detects movement of said user within said preselected period of time, wherein said movement detector includes:

a vibration detector which detects vibration;

an LPF for removing vibration caused by said vibrator from an output of said vibration detector; and a vibration decision circuit which identifies extraneous vibration other than vibration caused by said vibrator out of an output of said LPF.

16. An apparatus as claimed in claim 15, comprising:

a second timer for counting a second preselected period of time longer than said first period of time.

17. A method of controlling an electronic apparatus, comprising the steps of:

receiving a radio signal;

causing first notification means to notify a user of said apparatus to an incoming call;

counting a first preselected period of time;

determining whether or not an answer button is pressed;

determining whether or not movement of a user is present; and replacing said first notification means with second notification means when said answer button is not pressed and when movement of a user is not detected within said first preselected period of time, wherein said step of determining whether or not movement of said user is present includes:

detecting vibration;

generating a first signal based on said vibration; and generating a second signal by removing a portion of said first signal corresponding to vibration caused by said first notification means, said second signal identifying extraneous vibration other than vibration caused by said first notification means.

18. A method of controlling an electronic apparatus comprising the steps of:

receiving a radio signal;

causing first notification means to notify a user of said apparatus to a call incoming;

counting a first preselected period of time;

counting a second preselected period of time longer than said first period of time;

determining whether or not an answer button is pressed;

determining whether or not movement of a user is present; and replacing said first notification means with second notification means when said answer button is not pressed and when movement of a user is not detected within said second period of time, wherein said step of determining whether or not movement of said user is present includes:

detecting vibration;

generating a first signal based on said vibration; and generating a second signal by removing a portion of said first signal corresponding to vibration caused by said first notification means, said second signal identifying extraneous vibration other than vibration caused by said first notification means.

* * * * *